(12) United States Patent
Jang (10) Patent No.: US 11,858,455 B2
(45) Date of Patent: Jan. 2, 2024

(54) AIRBAG DEVICE

(71) Applicant: HYUNDAI MOBIS CO., LTD., Seoul (KR)

(72) Inventor: Rae Ick Jang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 11 days.

(21) Appl. No.: 17/093,933

(22) Filed: Nov. 10, 2020

(65) Prior Publication Data
US 2021/0138997 A1 May 13, 2021

(30) Foreign Application Priority Data
Nov. 11, 2019 (KR) ........................ 10-2019-0143420

(51) Int. Cl.
*B60R 21/276* (2006.01)
*B60R 21/239* (2006.01)

(52) U.S. Cl.
CPC .......... *B60R 21/276* (2013.01); *B60R 21/239* (2013.01); *B60R 2021/2395* (2013.01); *B60R 2021/2765* (2013.01)

(58) Field of Classification Search
CPC ................ B60R 21/239; B60R 21/276; B60R 2021/2395; B60R 2021/2765
See application file for complete search history.

(56) References Cited

U.S. PATENT DOCUMENTS

| 5,492,363 | A * | 2/1996 | Hartmeyer | B60R 21/239 280/738 |
| 9,216,712 | B1 * | 12/2015 | Kwon | B60R 21/239 |
| 11,214,228 | B2 * | 1/2022 | Suzuki | B60R 21/237 |
| 2004/0090055 | A1 * | 5/2004 | Kassman | B60R 21/2338 280/743.2 |
| 2005/0057029 | A1 * | 3/2005 | Thomas | B60R 21/2338 280/743.2 |
| 2006/0071461 | A1 * | 4/2006 | Williams | B60R 21/2338 280/739 |
| 2006/0151979 | A1 * | 7/2006 | DePottey | B60R 21/2338 280/739 |
| 2007/0126218 | A1 * | 6/2007 | Schnieder | B60R 21/239 280/739 |
| 2007/0145729 | A1 * | 6/2007 | Ishiguro | B60R 21/239 280/739 |
| 2008/0018086 | A1 * | 1/2008 | Ford | B60R 21/239 280/739 |
| 2008/0023950 | A1 * | 1/2008 | Kalczynski | B60R 21/239 280/739 |

(Continued)

FOREIGN PATENT DOCUMENTS

| DE | 102004049513 A1 * | 4/2006 | ......... B60R 21/2338 |
| GB | 2387152 A * | 10/2003 | ........... B60R 21/276 |

*Primary Examiner* — Barry Gooden, Jr.
(74) *Attorney, Agent, or Firm* — DLA PIPER LLP (US)

(57) ABSTRACT

An airbag device may include: an airbag cushion part inflated by operating gas introduced thereto; a vent part formed through the airbag cushion part, and configured to discharge the operating gas within the airbag cushion part; a cord movement prevention part mounted on one side of the vent part; and one or more tether cord parts mounted on the other side of the vent part, and configured to tighten and close the vent part while passing through the cord movement prevention part, when the airbag cushion part is deployed.

5 Claims, 7 Drawing Sheets

(56) References Cited

U.S. PATENT DOCUMENTS

| | | | | |
|---|---|---|---|---|
| 2008/0073891 A1* | 3/2008 | Rose | B60R 21/2338 | 280/739 |
| 2008/0073893 A1* | 3/2008 | Schneider | B60R 21/2346 | 280/740 |
| 2009/0039630 A1* | 2/2009 | Schneider | B60R 21/2338 | 280/740 |
| 2009/0256338 A1* | 10/2009 | Williams | B60R 21/2338 | 280/735 |
| 2010/0001498 A1* | 1/2010 | Abe | B60R 21/2338 | 280/739 |
| 2010/0032931 A1* | 2/2010 | Kumagai | B60R 21/239 | 280/742 |
| 2010/0052297 A1* | 3/2010 | Fukawatase | B60R 21/2338 | 280/732 |
| 2010/0102542 A1* | 4/2010 | Nakajima | B60R 21/233 | 280/743.2 |
| 2011/0031723 A1* | 2/2011 | Fischer | B60R 21/235 | 280/730.1 |
| 2011/0031725 A1* | 2/2011 | Rose | B60R 21/2338 | 280/736 |
| 2012/0001408 A1* | 1/2012 | Mendez | B60R 21/239 | 280/739 |
| 2012/0038138 A1* | 2/2012 | Kuhne | B60R 21/239 | 280/739 |
| 2012/0049491 A1* | 3/2012 | Yoo | B60R 21/214 | 280/729 |
| 2013/0334801 A1* | 12/2013 | Williams | B60R 21/239 | 280/739 |
| 2014/0151989 A1* | 6/2014 | Iwamoto | B60R 21/239 | 280/743.2 |
| 2014/0306434 A1* | 10/2014 | Jang | B60R 21/239 | 280/739 |
| 2015/0158454 A1* | 6/2015 | Shibata | B60R 21/239 | 280/742 |
| 2015/0183392 A1* | 7/2015 | Jang | B60R 21/239 | 280/739 |
| 2015/0239421 A1* | 8/2015 | Hiruta | B60R 21/23 | 280/742 |
| 2015/0283971 A1* | 10/2015 | Fischer | B60R 21/2338 | 280/742 |
| 2017/0210326 A1* | 7/2017 | Miura | B60R 21/239 | |
| 2018/0281742 A1* | 10/2018 | Komatsu | B60R 21/239 | |
| 2018/0334129 A1* | 11/2018 | Lim | B60R 21/239 | |
| 2019/0299913 A1* | 10/2019 | Tanaka | B60R 21/233 | |
| 2019/0322238 A1* | 10/2019 | Gould | B60R 21/2338 | |
| 2020/0130633 A1* | 4/2020 | Baba | B60R 21/203 | |

* cited by examiner

AIRBAG DEVICE

CROSS-REFERENCE TO RELATED APPLICATION

This application claims priority from and the benefit of Korean Patent Application No. 10-2019-0143420, filed on Nov. 11, 2019, which is hereby incorporated by reference for all purposes as if set forth herein.

BACKGROUND

Field

Exemplary embodiments of the present disclosure relate to an airbag device, and more particularly, to an airbag device which can change deployment pressure of an airbag cushion according to the position of a passenger.

Discussion of the Background

In general, a vehicle includes airbags to protect a passenger. The airbags are installed at various positions according to body parts of the passenger. At the front of the vehicle, a front airbag is installed. When an impact is applied to the vehicle, gas is injected into the front airbag. The front airbag may be inflated by gas supplied thereto, and deployed toward a passenger so as to prevent the passenger from colliding with a vehicle body.

However, during emergency braking of the vehicle, the passenger is moved forward by negative acceleration while the distance to the deployed airbag decreases. In this case, the passenger may be injured by a deployment force of the airbag. That is, the head of the passenger may be moved forward by the emergency braking of the vehicle, and contacted with the airbag. Then, the head or neck of the passenger may be injured by the deployment of the airbag. Therefore, there is a need for a device capable of solving the problem.

SUMMARY

Various embodiments are directed to an airbag device which can change deployment pressure of an airbag cushion according to the position of a passenger.

In an embodiment, an airbag device may include: an airbag cushion part inflated by operating gas introduced thereto; a vent part formed through the airbag cushion part, and configured to discharge the operating gas within the airbag cushion part; a cord movement prevention part mounted on one side of the vent part; and one or more tether cord parts mounted on the other side of the vent part, and configured to tighten and close the vent part while passing through the cord movement prevention part, when the airbag cushion part is deployed.

The cord movement prevention part may have both ends fixed to the vent part, and have an opening which is formed in such a size that the tether cord part passes through the opening.

The cord movement prevention part may be formed in a semicircular ring shape.

The tether cord part may have one end fixed to the vent part and the other end inserted into the cord movement prevention part, and the other end of the tether cord part may tighten and close the vent part while passing through the cord movement prevention part.

The tether cord part may have a stopper mounted at the other end thereof, and be configured to prevent the tether cord part from separating from the cord movement prevention part.

The stopper may have a length larger than the width of the opening of the cord movement prevention part.

The plurality of tether cord parts may pass through the cord movement prevention part.

The vent part may be formed in a circular hole shape or cross-shaped hole shape.

The airbag device in accordance with the embodiment of the present disclosure can tighten and close the vent part while the tether cord part passes through the cord movement prevention part. Thus, the airbag device can maintain preset pressure in the airbag cushion part and thus protect a passenger in case of a collision of the vehicle Furthermore, the stopper can prevent the separation of the tether cord part, with the tether cord part inserted into the cord movement prevention part. Thus, the airbag cushion part can maintain preset pressure.

DETAILED DESCRIPTION OF THE ILLUSTRATED EMBODIMENTS

Hereinafter, an airbag device will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
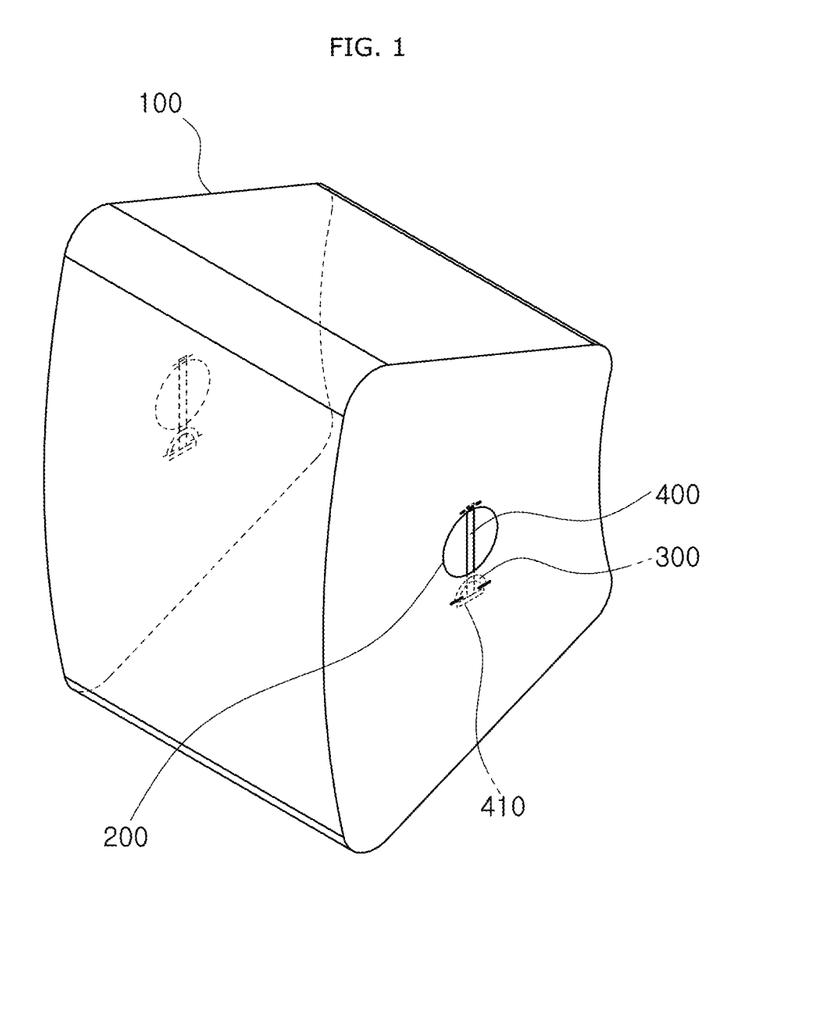
FIG. 1 is a perspective view schematically illustrating an airbag device in accordance with an embodiment of the present disclosure.
Figure 2:
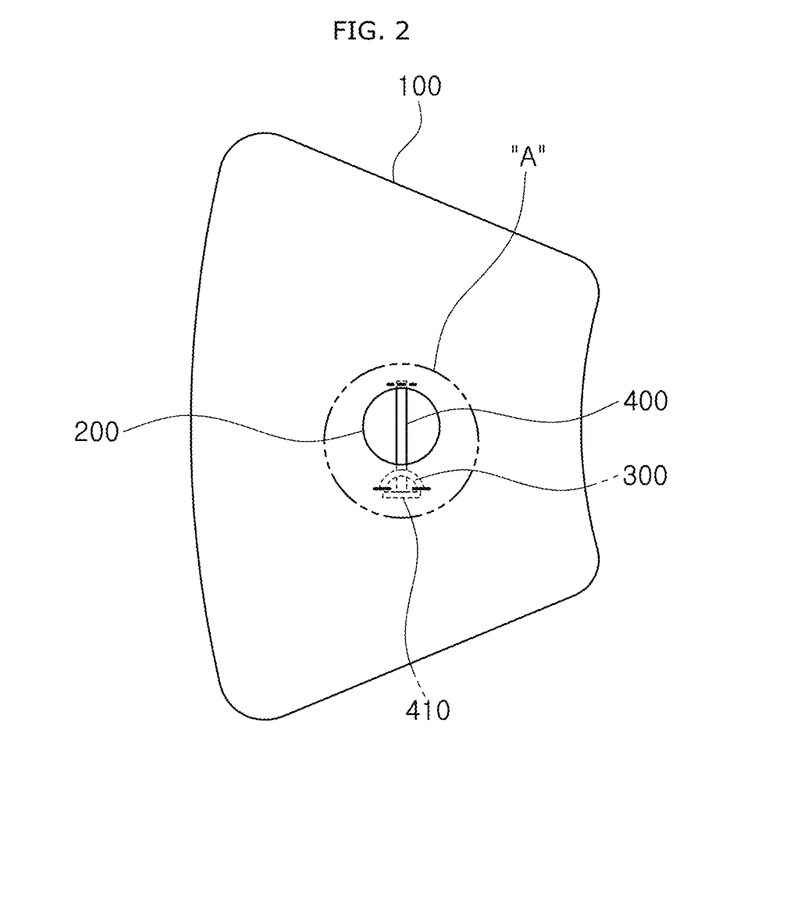
FIG. 2 is a side view schematically illustrating the airbag device in accordance with the embodiment of the present disclosure.
Figure 3:
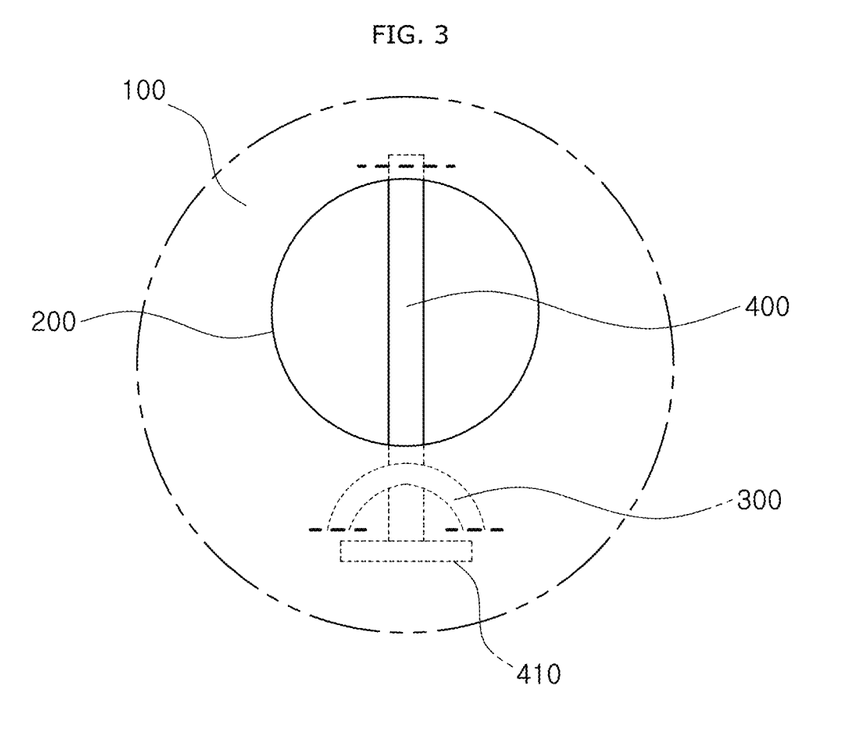
FIG. 3 is a conceptual view schematically illustrating a cord movement prevention part and a tether cord part in the airbag device in accordance with the embodiment of the present disclosure.
Figure 4:
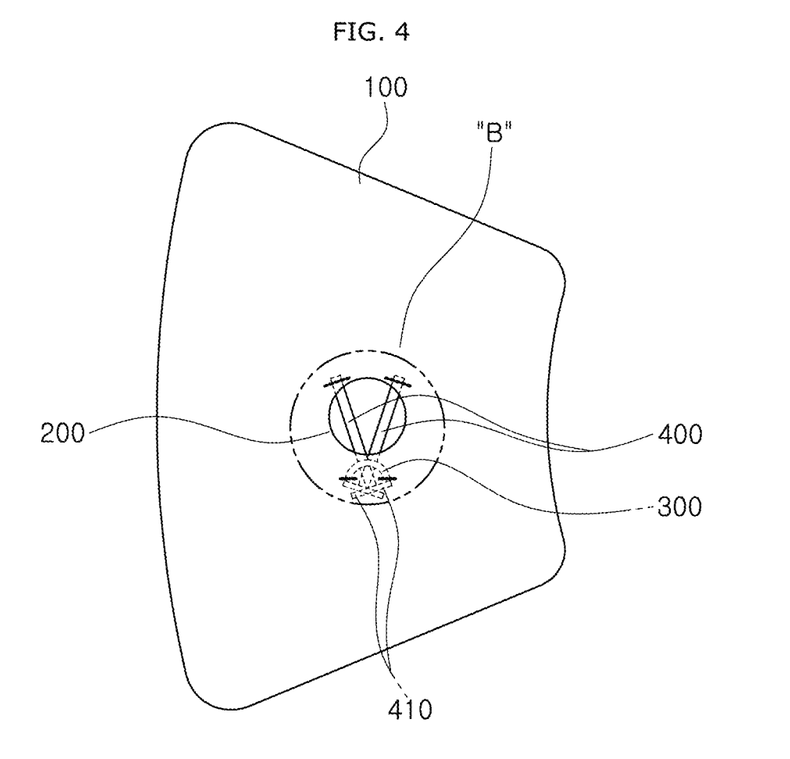
FIG. 4 is a side view schematically illustrating an airbag device in accordance with another embodiment of the present disclosure.
Figure 5:
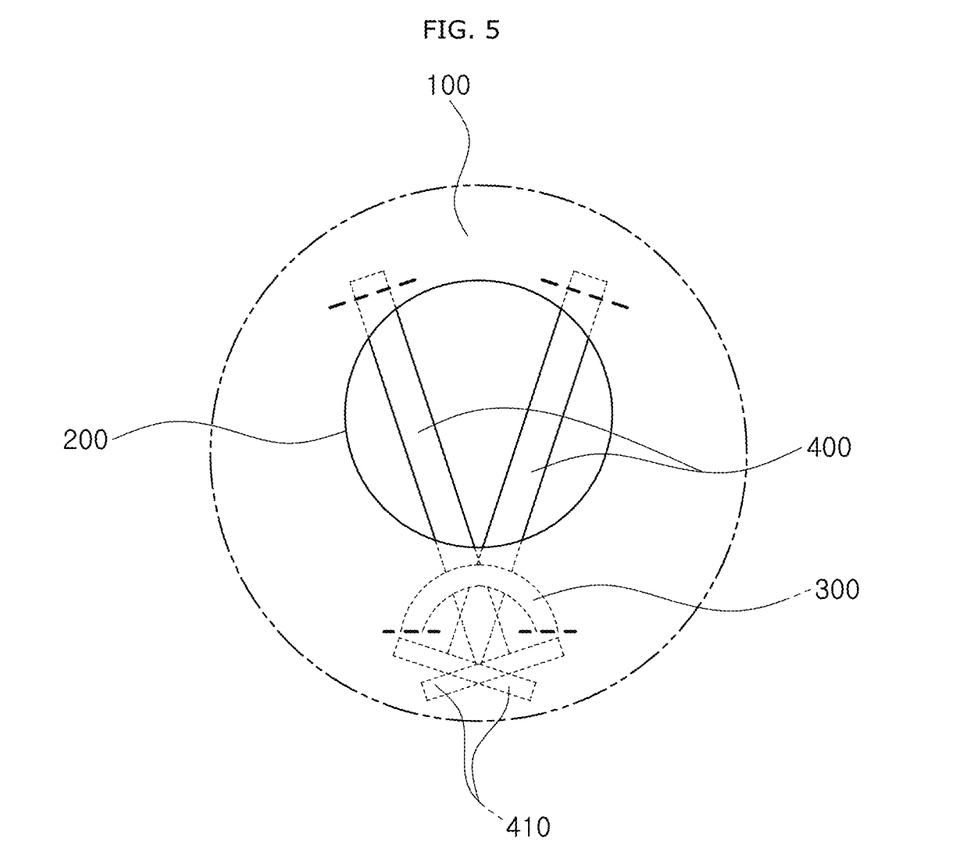
FIG. 5 is a conceptual view schematically illustrating a cord movement prevention part and a tether cord part in the airbag device in accordance with the another embodiment of the present disclosure.
Figure 6:
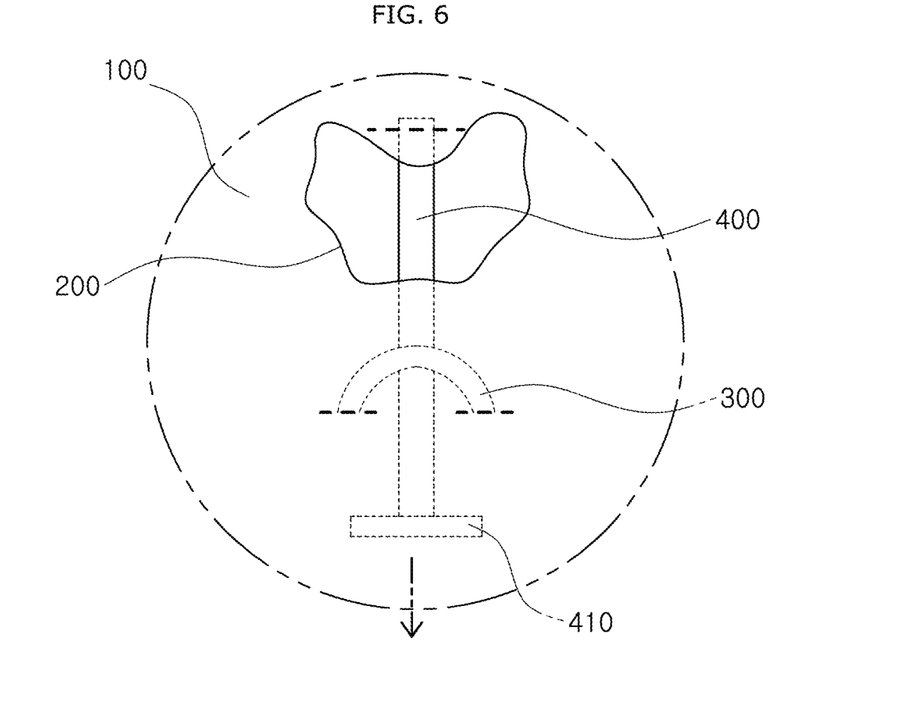
FIG. 6 is a conceptual view schematically illustrating an operation of the airbag device in accordance with the embodiment of the present disclosure.
Figure 7:
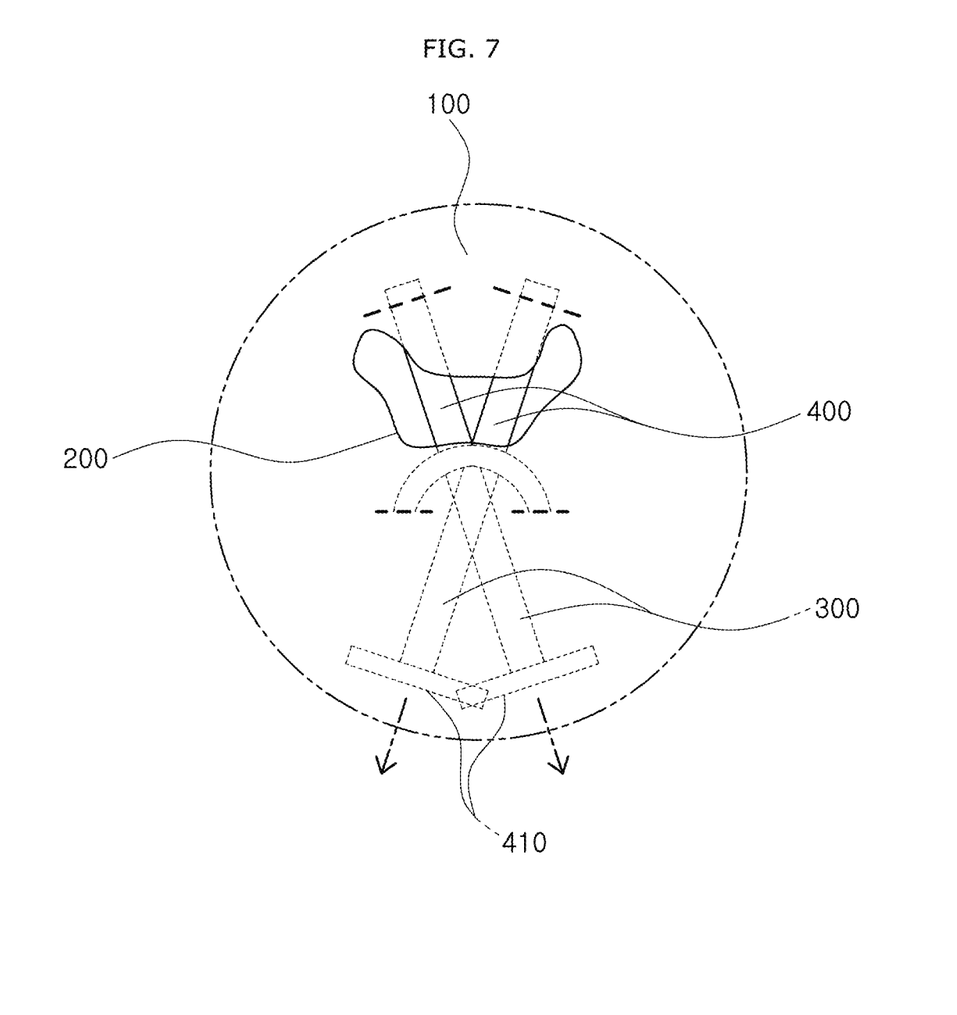
FIG. 7 is a conceptual view schematically illustrating an operation of the airbag device in accordance with the another embodiment of the present disclosure.

FIG. 1 is a perspective view schematically illustrating an airbag device in accordance with an embodiment of the present disclosure, FIG. 2 is a side view schematically illustrating the airbag device in accordance with the embodiment of the present disclosure, FIG. 3 is a conceptual view schematically illustrating a cord movement prevention part and a tether cord part in the airbag device in accordance with the embodiment of the present disclosure, FIG. 4 is a side view schematically illustrating an airbag device in accordance with another embodiment of the present disclosure, FIG. 5 is a conceptual view schematically illustrating a cord movement prevention part and a tether cord part in the airbag device in accordance with the another embodiment of the present disclosure, FIG. 6 is a conceptual view schematically illustrating an operation of the airbag device in accordance with the embodiment of the present disclosure, and FIG. 7 is a conceptual view schematically illustrating an operation of the airbag device in accordance with the another embodiment of the present disclosure.

Referring to FIGS. 1 to 3, an airbag device in accordance with an embodiment of the present disclosure includes an airbag cushion part 100, a vent part 200, a cord movement prevention part 300 and a tether cord part 400.

The airbag cushion part 100 is inflated by operating gas which is jetted from an inflator (not illustrated) and introduced thereto. The vent part 200 is formed through the airbag cushion part 100, and discharges the operating gas within the airbag cushion part 100 to the outside.

In the present disclosure, the vent part 200 is formed on either side (based on FIG. 1) of the airbag cushion part 100. While the operating gas of the airbag cushion part 100 is discharged through the vent part 200, the internal pressure of the airbag cushion part 100 may be lowered to prevent damage to a passenger due to contact with the passenger.

The vent part 200 may be formed in a circular hole shape or cross-shaped hole shape. Through the vent part 200 formed in a circular hole shape, the operating gas may be easily discharged. The vent part 200 having a cross-shaped hole shape may be cut and formed in a cross-shape. The vent part 200 formed in a cross-shaped hole shape may discharge the operating gas while restricting the discharge of the operating gas in comparison to the vent part 200 formed in a circular hole shape.

The cord movement prevention part 300 is mounted on one side (bottom side in FIG. 2) of the vent part 200. The cord movement prevention part 300 has both ends sewed and fixed to one side of the vent part 200. The cord movement prevention part 300 has an opening which is formed in such a size that the tether cord part 400 can pass through the opening. That is, the width of the opening of the cord movement prevention part 300 is larger than the width of the tether cord part 400.

In the present disclosure, the cord movement prevention part 300 is formed in a semicircular ring shape. Both ends of the cord movement prevention part 300 formed in a semicircular ring shape are sewed and fixed to the vent part 200.

The tether cord part 400 is mounted on the other side (top side in FIG. 2) of the vent part 200. When the airbag cushion part 100 is deployed, the tether cord part 400 closes the vent part 200 by tightening the vent part 200 while passing through the cord movement prevention part 300.

The tether cord part 400 may tighten the vent part 200 while passing through the cord movement prevention part 300. Thus, the tether cord part 400 may reduce an impact to a passenger while blocking the internal pressure of the airbag cushion part 100 from decreasing to a predetermined value or less.

In the present disclosure, the tether cord part 400 is formed in a string shape passing through the cord movement prevention part 300. The tether cord part 400 formed in a string shape passes through the opening of the cord movement prevention part 300.

The tether cord part 400 has one end (upper end in FIG. 2) sewed and fixed to the vent part 200 and the other end (lower end in FIG. 2) inserted into the cord movement prevention part 300. That is, the other end of the tether cord part 400 may be partially inserted into the cord movement prevention part 300. While the airbag cushion part 100 is deployed, the other end of the tether cord part 400 may be easily inserted into and pass through the cord movement prevention part 300 having a semicircular ring shape.

In the present disclosure, the tether cord part 400 has a stopper 410 mounted at the other end (lower end in FIG. 2) thereof. The stopper 410 has a length larger than the width of the opening of the cord movement prevention part 300. Therefore, since the stopper 410 is mounted at the other end of the tether cord part 400 and has a larger length than the width of the opening of the cord movement prevention part 300, the stopper 410 may be locked to the opening of the cord movement prevention part 300, thereby preventing the tether cord part 400 from separating from the cord movement prevention part 300.

When the airbag cushion part 100 is deployed, the tether cord part 400 passes through the cord movement prevention part 300 in the longitudinal direction (bottom side in FIG. 2) of the tether cord part 400, while the stopper 410 prevents the tether cord part 400 from separating from the cord movement prevention part 300.

The tether cord part 400 may close the vent part 200 by tightening the vent part 200 while passing through the cord movement prevention part 300, and thus block the discharge of the operating gas within the airbag cushion part 100, which makes it possible to protect a passenger while maintaining predetermined pressure.

Referring to FIGS. 4 and 5, an airbag device in accordance with another embodiment of the present disclosure will be described. The airbag device in accordance with the another embodiment of the present disclosure includes an airbag cushion part 100, a vent part 200, a cord movement prevention part 300 and a tether cord part 400.

Since the airbag cushion part 100, the vent part 200 and the cord movement prevention part 300 have the same structures as those of the above-described embodiment, the detailed descriptions thereof are omitted herein. Furthermore, the descriptions of the tether cord part 400 in accordance with the another embodiment of the present disclosure, which are not separately made in the following descriptions, may be substituted with those of the above embodiment.

In the another embodiment of the present disclosure, the plurality of tether cord parts 400 pass through the cord movement prevention part 300.

The plurality of tether cord parts 400 are mounted on the other side (top side in FIG. 4) of the vent part 200. When the airbag cushion part 100 is deployed, the tether cord parts 400 close the vent part 200 by tightening the vent part 200 while passing through the cord movement prevention part 300. The plurality of tether cord parts 400 are disposed in the vent part 200 so as to be spaced apart from each other, while passing through one cord movement prevention part 300.

The plurality of tether cord parts 400 may close the vent part 200 by tightening the vent part 200 while passing through the cord movement prevention part 300, and thus block the discharge of the operating gas within the airbag cushion part 100, which makes it possible to protect a passenger while maintaining predetermined pressure. That is, since the plurality of tether cord parts 400 can pass through the cord movement prevention part 300, it is possible to reduce the time required for tightening the vent part 200 further than when one tether cord part 400 passes through the cord movement prevention part 300.

Each of the tether cord parts 400 in accordance with the another embodiment of the present disclosure also has a stopper 410 mounted thereon.

The operation of the airbag device in accordance with the embodiments of the present disclosure will be described with reference to FIGS. 6 and 7.

The operation of the airbag device in accordance with the embodiment of the present disclosure will be described with reference to FIG. 6. When a vehicle accident occurs, operating gas is jetted from the inflator and introduced into the airbag cushion part 100. The airbag cushion part 100 is inflated by the operating gas introduced thereto.

When the airbag cushion part 100 is deployed, the tether cord part 400 closes the vent part 200 by tightening the vent part 200 while passing through the cord movement prevention part 300.

When the airbag cushion part 100 is deployed, the tether cord part 400 passes through the cord movement prevention part 300 in the longitudinal direction (bottom side in FIG. 6) of the tether cord part 400, while the stopper 410 mounted on the tether cord part 400 prevents the tether cord part 400 from separating from the cord movement prevention part 300.

The tether cord part 400 may close the vent part 200 by tightening the vent part 200 while passing through the cord movement prevention part 300, and block the discharge of the operating gas within the airbag cushion part 100, which makes it possible to protect a passenger while maintaining predetermined pressure.

The operation of the airbag device in accordance with the another embodiment of the present disclosure will be described with reference to FIG. 7. When a vehicle accident occurs, operating gas is jetted from the inflator and introduced into the airbag cushion part 100. The airbag cushion part 100 is inflated by the operating gas introduced thereto.

When the airbag cushion part 100 is deployed, the plurality of tether cord parts 400 close the vent part 200 by tightening the vent part 200 while passing through the cord movement prevention part 300. Since the plurality of tether cord parts 400 pass through the cord movement prevention part 300, it is possible to shorten the time required for tightening and closing the vent part 200 further than when one tether cord part 400 passes through the cord movement prevention part 300.

When the airbag cushion part 100 is deployed, the tether cord parts 400 pass through the cord movement prevention part 300 in the longitudinal direction (bottom side in FIG. 7) of the tether cord parts 400, while the stopper 410 mounted on the tether cord parts 400 prevent the tether cord part 400 from separating from the cord movement prevention part 300.

The plurality of tether cord parts 400 may close the vent part 200 by tightening the vent part 200 while passing through the cord movement prevention part 300, and thus rapidly close the vent part 200 and block the discharge of the operating gas within the airbag cushion part 100, which makes it possible to protect a passenger while maintaining predetermined pressure.

The airbag device in accordance with the embodiment of the present disclosure can tighten and close the vent part 200 while the tether cord part 400 passes through the cord movement prevention part 300. Thus, the airbag device can maintain preset pressure in the airbag cushion part 100 and thus protect a passenger in case of a collision of the vehicle In accordance with the embodiments of the present disclosure, the stopper 410 can prevent the separation of the tether cord part 400, with the tether cord part 400 inserted into the cord movement prevention part 300. Thus, the airbag cushion part 100 can maintain preset pressure.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag device comprising:
    an airbag cushion part inflated by operating gas introduced thereto;
    a vent part comprising an opening formed through the airbag cushion part, and configured to discharge the operating gas within the airbag cushion part;
    a cord movement prevention part mounted on one side of the vent part; and
    one or more tether cord parts mounted on the other side of the vent part, and configured to tighten and close the vent part while passing through the cord movement prevention part, when the airbag cushion part is deployed, wherein, when the airbag cushion part is deployed, the one or more tether cord parts tightens the vent part and reduces a size of the opening of the vent part,
    wherein each of the one or more tether cord parts has one end fixed to the vent part and the other end inserted into the cord movement prevention part,
    wherein the other end of said each tether cord part tightens and closes the vent part while passing through the cord movement prevention part,
    wherein said each tether cord part has a stopper mounted at the other end thereof, and the stopper is configured to prevent said each tether cord part from separating from the cord movement prevention part, and
    wherein the stopper has a length larger than a width of the opening of the cord movement prevention part;
    wherein the cord movement prevention part is formed in a semicircular ring shape and, when the airbag cushion is deployed, the stopper is pulled toward the cord movement prevention part until impacting the cord movement prevention part, preventing said each tether cord part from separating from the cord movement prevention part.

2. The airbag device of claim 1, wherein the cord movement prevention part has both ends fixed to the vent part, and has an opening configured to allow the one or more tether cord parts to pass through the opening.

3. The airbag device of claim 2, wherein the cord movement prevention part is formed in a semicircular ring shape.

4. The airbag device of claim 1, wherein a plurality of the one or more tether cord parts pass through the cord movement prevention part.

5. The airbag device of claim 1, wherein the vent part is formed in a circular hole shape or cross-shaped hole shape.

* * * * *